(12) United States Patent
Miyatake et al.

(10) Patent No.: US 7,728,863 B2
(45) Date of Patent: *Jun. 1, 2010

(54) OPTICAL SCANNING DEVICE AND IMAGE FORMING APPARATUS

(75) Inventors: Naoki Miyatake, Tokyo (JP); Shigeaki Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1632 days.

This patent is subject to a terminal disclaimer.

(21) Appl. No.: 10/852,183

(22) Filed: May 25, 2004

(65) Prior Publication Data

US 2004/0240000 A1   Dec. 2, 2004

(30) Foreign Application Priority Data

May 29, 2003   (JP)   ............................. 2003-152726

(51) Int. Cl.
B41J 15/14   (2006.01)
B41J 27/00   (2006.01)
G02B 26/08   (2006.01)

(52) U.S. Cl. ..................... 347/244; 347/258; 359/206.1

(58) Field of Classification Search ......... 347/243–244, 347/258–261; 359/204–205, 205.1, 218.1, 359/206.1
See application file for complete search history.

(56) References Cited

U.S. PATENT DOCUMENTS

| | | | | |
|---|---|---|---|---|
| 5,206,755 A * | 4/1993 | Yamakawa | ............... | 359/218.1 |
| 5,680,254 A | 10/1997 | Ueda et al. | | |
| 6,104,521 A * | 8/2000 | Iizuka | ..................... | 359/205.1 |
| 6,392,772 B1 * | 5/2002 | Hama et al. | ................. | 359/204 |
| 6,448,998 B1 * | 9/2002 | Suzuki et al. | ............... | 347/258 |
| 6,621,512 B2 | 9/2003 | Nakajima et al. | | |
| 6,771,300 B2 | 8/2004 | Amada et al. | | |
| 6,856,439 B2 * | 2/2005 | Inagaki | ....................... | 359/204 |
| 6,965,465 B2 * | 11/2005 | Ishihara | ...................... | 359/205 |
| 7,414,765 B2 * | 8/2008 | Miyatake | .................... | 359/205 |

FOREIGN PATENT DOCUMENTS

JP   62-237419   10/1987

(Continued)

OTHER PUBLICATIONS

U.S. Appl. No. 10/139,325, filed May 7, 2002, Miyatake et al.

(Continued)

*Primary Examiner*—Hai C Pham
(74) *Attorney, Agent, or Firm*—Oblon, Spivak, McClelland, Maier & Neustadt, L.L.P.

(57) ABSTRACT

An optical scanning device has a light source, a unit configured to deflect a light beam from the light source; and a system including at least two scanning lenses and configured to guide the light beam deflected to a surface to be scanned. One of the scanning lenses closest to the deflecting unit has a positive refractive power in a main scanning direction and zero or approximately zero refractive power in a sub scanning direction, and another one of the scanning lenses closest to the surface has a negative refractive power in the main scanning direction, a positive refractive power in the sub scanning direction, and an incidence surface in the sub-scanning direction which is convex toward the deflecting unit.

9 Claims, 10 Drawing Sheets

FOREIGN PATENT DOCUMENTS

| | | |
|---|---|---|
| JP | 7-43627 | 2/1995 |
| JP | 7-110451 | 4/1995 |
| JP | 07146437 A * | 6/1995 |
| JP | 7-230051 | 8/1995 |
| JP | 7-287180 | 10/1995 |
| JP | 9-54263 | 2/1997 |
| JP | 9-58053 | 3/1997 |
| JP | 9-127443 | 5/1997 |
| JP | 11-157128 | 6/1999 |
| JP | 2000-47127 | 2/2000 |
| JP | 2000-350110 | 12/2000 |
| JP | 2001-4948 | 1/2001 |
| JP | 2001-10107 | 1/2001 |
| JP | 2001-33720 | 2/2001 |
| JP | 2001-125028 | 5/2001 |
| JP | 2001125028 A * | 5/2001 |
| JP | 2001-255479 | 9/2001 |

OTHER PUBLICATIONS

U.S. Appl. No. 10/347,746, filed Jan. 22, 2003, Suzuki et al.
U.S. Appl. No. 10/382,530, filed Mar. 7, 2003, Hayashi et al.
U.S. Appl. No. 10/395,128, filed Mar. 25, 2003, Hayashi et al.
U.S. Appl. No. 10/421,786, filed Apr. 24, 2003, Atsuumi et al.
U.S. Appl. No. 10/609,577, filed Jul. 1, 2003, Nakajima et al.
U.S. Appl. No. 10/665,287, filed Sep. 22, 2003, Kubo.
U.S. Appl. No. 11/496,514, filed Aug. 1, 2006, Hirakawa et al.
U.S. Appl. No. 11/508,881, filed Aug. 24, 2006, Imai et al.
U.S. Appl. No. 11/961,337, filed Dec. 20, 2007, Imai.
U.S. Appl. No. 12/020,292, filed Jan. 25, 2008, Miyatake et al.
U.S. Appl. No. 12/028,446, filed Feb. 8, 2008, Nakamura, et al.
U.S. Appl. No. 12/207,739, filed Sep. 10, 2008, Imai.

* cited by examiner

OPTICAL SCANNING DEVICE AND IMAGE FORMING APPARATUS

CROSS-REFERENCE TO RELATED APPLICATIONS

The present document incorporates by reference the entire contents of Japanese priority document, 2003-152726 filed in Japan on May 29, 2003.

BACKGROUND OF THE INVENTION

1) Field of the Invention

The present invention relates to an optical scanning device as an optical writing unit of an image forming apparatus, and to an image forming apparatus such as a digital copying machine, a laser printer, a laser facsimile machine, a laser plotter, or the like having the optical scanning device.

2) Description of the Related Art

An optical scanning device which is widely known in association with a laser printer or the like is generally so designed that a light beam coming from an optical source is deflected by a deflecting unit such as light deflector, condensed on a surface to be scanned through a scanning and imaging optical system such as fθ lens to form an light spot on the surface to be scanned, and with this light spot optical scanning in the main scanning direction is conducted on the surface to be scanned. The substantial material forming the surface to be scanned is a photoconductive surface of a photoconductive medium realized by a photoconductive photoconductors or the like.

In these years, writing density of optical scanning device keeps on increasing, and 1,200 dpi (dots per inch), 1,600 dpi or even higher writing densities are intended to be realized. In realizing such high writing densities, stability of the light spot is an essential factor. When "change in diameter of light spot on the surface to be scanned depending on the height of the image" is small, the light spot is said to be stable. In order to achieve the stability, the scanning and imaging optical system which images the light flux deflected by the deflector onto the surface to be scanned in the form of a light spot should have high performance. One factor that changes the diameter of light spot is "field curvature by the scanning and imaging optical system" as is known in the art, and a number of scanning and imaging optical systems that satisfactory correct this field curvature have been proposed heretofore. It is also important that the optical magnification of the scanning and imaging optical system is constant regardless of the image height, in order to support multi beam configuration that stabilizes the light spot and realize high writing density.

In one example of an image forming apparatus that uses the above optical scanning device, a color image is produced in the following manner. Four photoconductors are arranged in the feeding direction of recording sheet; light fluxes of light beams emitted from a plurality of light sources corresponding to the respective photoconductors are deflected by a single deflecting unit for scanning; the photoconductors are exposed to light simultaneously by a plurality of scanning and imaging optical systems corresponding to the respective photoconductors to form latent images; the latent images are visualized at developers each uses different colors, such as yellow, magenta, cyan, black and like; and the resultant visible images are sequentially transferred and fixed onto the same recording sheet so that they overlap with each other.

The image forming apparatus in which two or more sets of optical scanning device and photoconductor are used to obtain two-color images, multicolor images and the like color images is known as "tandem-type image forming apparatus".

As such a tandem type image forming apparatus, for example, the following systems (1) to (4) in which a single light deflector is commonly used by a plurality of photoconductive media have been proposed.

(1) Opposite scanning system wherein light fluxes enter from both sides of the light deflector, and scanning is conducted while separating the deflected light fluxes as disclosed in Japanese Patent Application Laid-Open Nos. 11-157128 and 9-127443.

(2) Scanning system wherein a plurality of light fluxes which are substantially parallel and distanced in the sub scanning direction enter a light deflector, and scanning is conducted by a plurality of scanning optical elements corresponding to the plurality of light fluxes arranged in the sub scanning direction as disclosed in Japanese Patent Application Laid-Open No. 9-54263.

(3) Scanning system wherein light fluxes enter from either side of the light deflector, and the scanning and imaging optical system is structured by three lens: scanning lenses L1 and L2 through which a plurality of light fluxes which travel toward different surfaces to be scanned and scanning lens L3 which is provided for each surface to be scanned as disclosed in Japanese Patent Application Laid-Open Nos. 2001-4948, 2001-10107, and 2001-33720.

In the manner as described above, by sharing the light deflector with a plurality of surfaces to be scanned and reducing the number of light deflector, it is possible to reduce the size and cost of the image forming apparatus.

As an optical scanning device that is applicable to the tandem type image forming apparatus proposed by the applicant, the one disclosed in Japanese Patent Application Laid-Open No. 2000-350110 can be recited.

It is a primary object of the present invention to desirably correct field curvature in the main and sub scanning directions to realize stability of the light spot while satisfactory keeping "conjugating function" and "speed equalizing function", and to provide constant optical magnification with respect to the image height of the light spot.

In recent years, a special surface represented by aspheric surface is generally employed for an optical element of an optical scanning device in order to improve the scanning characteristics. "Optical elements formed of resin (plastic)" are often used because they can be easily processed into a special surface and are cost-effective. Particularly in the tandem type image forming apparatus as described above, since the number of optical elements to be used is large, significant cost reduction effect is achieved by using optical elements formed of resin.

When optical elements formed of resin are used in the optical scanning device, reflection preventing coating is not often applied on the surface of the lens on account of ease of production. The reflected light generated by surface reflection of lens or by reflection between lenses returns to the deflecting surface of the light deflector where it is deflected and scanned again, and then enters the surface to be scanned to become ghost (flare) light. In consideration of recent improvement in sensitivity of photoconductor, the existence of ghost is getting inevitable.

Furthermore, in the optical scanning device, when the internal temperature of the optical box is elevated by the deflector that generates great heat such as polygon mirror, the heat will not uniformly transmit due to the air flow created by rotation of the polygon mirror or the shape variation inside the optical box, so that the internal temperature of the optical box has temperature distribution. Also in the scanning lens, the temperature does not change uniformly because of difference in manner of heat transmission, difference in shape of lens (difference in installation area in the optical box) and the like, so that temperature difference occurs depending on the position within the scanning lens.

When optical elements formed of resin are used in such an optical scanning device, the shape largely changes with temperature change and characteristics of the optical elements formed of resin also change because resins have larger coefficient of thermal expansion than glass.

In the tandem type image forming apparatus, the light fluxes directed to the respective photoconductors pass thorough different scanning lenses. Since different temperature distributions occur in the different scanning lenses due to the temperature distribution within the optical box accommodating the scanning lenses, change in shape and change in refractive index of the scanning lens is not uniform, change amount of scanning line length and change in speed uniformity differ among the different photoconductors. After visualizing these latent images by developers using different colors of developing agents of yellow, magenta, cyan, black and the like, the resultant visible images are transferred to the same recording sheet in overlapped manner and fixed, whereby a color image is obtained. In this case, so-called "out of color registration" occurs. In particular, when the scanning lens nearest to the deflector that generates great heat within the optical box such as polygon mirror, the change in optical characteristics is also large.

In the case of continuous output, in particular, when a large number of sheets are continuously output, the internal temperature (temperature in the optical box) rises due to heat generation by the deflector. This results in change in temperature distribution in each scanning lens, occurrence of out of color registration described above, as well as change in variation amount thereof. As a result of this, color difference occurs between the first outputted image and the last outputted image due to out of color registration.

For solving the above problem of "change in scanning line length", a method is known wherein light receivers are provided on the write starting side and the write ending side, respectively, and the image frequency of each light beam is adjusted according to the difference in light receiving time between these light receivers as disclose in Japanese Patent Application Laid-Open No. 9-58053. For employing this method to the tandem type image forming apparatus wherein "light deflector is shared by a plurality of surfaces to be scanned", space for installing the light receiver is required on the write ending side, so that it becomes difficult to keep the available writing width.

Furthermore, in the method wherein light receivers are provided on the write starting side and the write ending side, respectively, and the image frequency of each light beam is adjusted according to the difference in light receiving time between these light receivers, the length of scanning line at each photoconductor can be corrected, however, the change in speed uniformity due to temperature distribution of each scanning lens can not be corrected. For this reason, even if dot positions in the main scanning direction are corrected at starting and ending points of writing at each photoconductor, dot positions at the middle points in the main scanning direction do not coincide, so that out of color registration occurs.

In the tandem type optical scanning device, there are many cases that the scanning lens nearest to the deflector that generates great heat such as polygon mirror is formed of glass for solving the above problem. However, the scanning lens formed of glass entails the problem of significantly larger cost compared to the scanning lens formed of resin.

Furthermore, the tandem type image forming apparatuses as described in (1) to (3) above entail the following problems.

With the system (1) exclusively, only two different surfaces to be scanned can be scanned, and four color writing cannot be conducted. Furthermore, since light beams directed toward the respective surfaces to be scanned pass through the different scanning optical elements, the beam position deviates from each other between the respective surfaces to be scanned, and the "out of color registration" is likely to occur.

In the system (2), the size of apparatus such as light deflector increases. This also leads the problems of accompanying noise, increase in consumption power, impaired durability, and raise in cost due to increased number of optical elements. Furthermore, since light beams directed toward the respective surfaces to be scanned pass through the different scanning optical elements, the beam position deviates from each other between the respective surfaces to be scanned, and the "out of color registration" is likely to occur.

In the system (3), since the scanning lens L1 has positive power in the sub scanning direction, and the light fluxes directed toward the respective surfaces to be scanned are converged, it is difficult to separate the light fluxes to the respective surfaces to be scanned.

Furthermore, for solving the problem regarding the ghost light, inventions disclosed in Japanese Patent Application Laid-Open Nos. 7-287180 and 7-230051 can be exemplified. However, since they are provided with shift or tilt of scanning lens or light shielding member inside the apparatus, they still have the problems of deterioration of optical characteristics and complication of the apparatus. Also, neither of these inventions has solve the problem that the light reflected at the lens surface of the scanning lens or reflected between lens surfaces returns to the light deflector and becomes ghost light on the surface to be scanned.

SUMMARY OF THE INVENTION

It is an object of the present invention to solve at least the problems in the conventional technology.

An optical scanning device according to an aspect of the present invention has a light source; a deflecting unit configured to deflect a light beam from the light source; and a scanning and imaging optical system including at least two scanning lenses and configured to guide the light beam deflected by the deflecting unit to a surface to be scanned, wherein one of the scanning lenses which is closest to the deflecting unit has a positive refractive power in a main scanning direction and zero or approximately zero refractive power in a sub scanning direction, and another one of the scanning lenses which is closest to the surface to be scanned has a negative refractive power in the main scanning direction, a positive refractive power in the sub scanning direction, and an incidence surface in the sub-scanning direction which is convex toward the deflecting unit.

An image forming apparatus according to anther aspect of the present invention has an image bearing member; an optical writing unit configured to perform optical writing according to image information to form a latent image on the image bearing member; a developing unit configured to develop the latent image on the image bearing member into a visible image; a transferring unit configured to transfer the visible image on the image bearing member onto a material directly or via an intermediate transferring member; and a fixing unit configured to fix the visible image transferred onto the material, wherein the optical writing unit comprises the optical scanning device according to the above aspect.

An image forming apparatus for forming multicolor or full color images according to still anther aspect of the present invention has a plurality of image bearing members; an optical writing unit configured to perform optical writing according to image information to form a latent image on each of the image bearing members; a developing unit configured to develop the latent images on the image bearing members into visible images; a transferring unit configured to transfer the visible images on the image bearing members onto a material directly or via an intermediate transferring member; and a fixing unit configured to fix the visible images transferred onto the material; wherein the optical writing unit comprises the optical scanning device according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is an explanatory view of a structure of a polygon scanner representing one example of a deflecting unit of an optical scanning device according to the present invention, in which

DETAILED DESCRIPTION

Exemplary embodiments of the present invention are explained in detail below with reference to the accompanying drawings.

First an embodiment of the optical scanning device according to the present invention will be explained.

The optical scanning device according to the present embodiment has a light source, a deflector which deflects a light beam from the light source, and a scanning and imaging optical system which introduces the light beam deflected by the deflector to a surface to be scanned. The scanning and imaging optical system consists of at least two scanning lenses. The lens nearest to the deflector has positive refractive power in the main scanning direction and zero or approximately zero power in the sub scanning direction. The scanning lens nearest to the surface to be scanned has negative refractive power in the main scanning direction and positive refractive power in the sub scanning direction.

Figure 1:
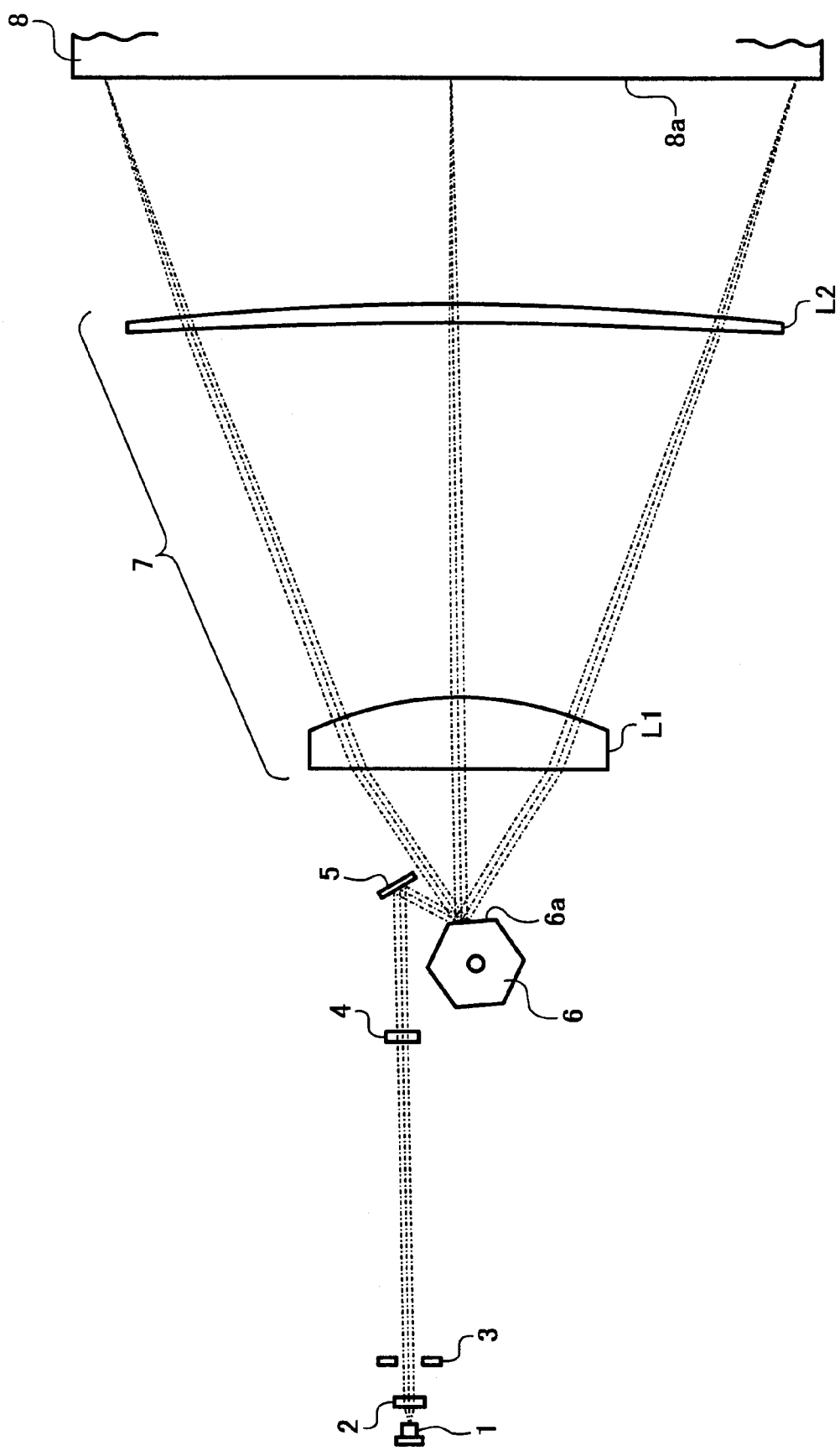
FIG. 1 is an explanatory view of a structure of an optical scanning device representing one embodiment of the present invention.

In one example, an optical scanning device having a scanning and imaging optical system consisting of two scanning lenses is shown in FIG. 1. In FIG. 1, a light beam emitted from the optical source (for example, semiconductor laser) 1 is coupled with a parallel light flux (which may be weak converging flux or diverging flux) by a first optical system (for example, collimate lens) 2. The coupled light beam passes through an aperture stop (aperture) 3 so as to have a desired beam spot diameter on the surface to be scanned, followed by a second optical system (for example, cylindrical lens) 4, after which the light beam is turned back at a return mirror 5 to form a long line image along the main scanning direction near the light deflector 6 which serves as the deflecting unit. Then, the light flux scanned on the deflecting surface 6a of the light deflector 6 passes through the scanning lens L1 and L2 of a third optical system (scanning and imaging optically system) 7, scans a surface to be scanned 8a of the photoconductive medium 8 formed of photoconductive photoconductor or the like at approximately constant speed, and condenses the light near the surface to be scanned.

In the optical scanning apparatus of the present embodiment, the scanning lens L1 nearest to the light deflector 6 has positive refractive power in the main scanning direction, and desirably corrects the speed uniformity. On the other hand, the scanning lens L2 nearest to the surface to be scanned 8a has negative refractive power, so that it cancels deterioration of optical characteristics in the case of environmental changes, and wavelength changes. Furthermore, since the scanning lens L2 nearest to the surface to be scanned 8a has an elongated shape, there is a significant problem in terms of processability. However, since the scanning lens L2 of the present embodiment has negative refractive power, and the thickness of the lens can be easily made uniform in the main scanning direction, the scanning lens L2 is advantageous from the view point of processability.

With regard to the sub scanning direction, the refractive power of the scanning lens L1 nearest to the light deflector 6 is zero or approximately zero. However, since this scanning L1 has strong negative refractive power with regard to the main scanning direction as described above, it desirably corrects the speed uniformity.

Since this scanning lens L1 has almost no refractive power in the sub scanning direction, the main scanning section does not change in the sub scanning direction. Accordingly, even when the incident light flux deviates in the sub scanning direction, the speed uniformity is not deteriorated. Also it is possible to suppress deterioration of the imaging performance in the main scanning direction.

Furthermore, in the present embodiment, since the refractive power of the sub scanning direction of the scanning lens L1 nearest to the light deflector 6 is approximately zero, the scanning lens L2 nearest to the surface to be scanned has strong positive refractive index. As a result, the magnification in the sub scanning direction of the scanning and imaging optical system 7 is a reducing system where the deterioration of performance due to errors in installation of components or errors in shape of components can be suppressed. With regard to the sub scanning direction, it goes without saying that the base point of the deflecting surface 6a of the light deflector 6 is in conjugation with the surface to be scanned 8a, therefore the face tangle error correcting function is provided for the deflecting surface 6a of the light deflector 6.

Furthermore, according to the present embodiment, it is also possible to desirably correct the field curvature in both the main and sub scanning directions by making the surface shape in the main scanning direction of the scanning lens L1 nearest to the light deflector 6 non-arc shape, or by designing the other scanning lens L2 to have a non-arc shape in the main scanning direction and have radius of curvature in the sub scanning section varying in the mains scanning direction so that the center line of curvature connecting the centers of curvature within the sub scanning section in the main scanning direction is a curve which is different from the non-arc shape of the main scanning direction within the main scanning section.

As a result of this, according to the present embodiment, it is possible to desirably correct the field curvature in the sub scanning direction and realize the stability of the light spot while keeping the "conjugating function" and "speed equalizing function" satisfactorily in the scanning and imaging optical system.

Furthermore, in the optical scanning device of the present invention, the light flux passed through the second optical system (for example cylindrical lens) 4 is narrowed down in the sub scanning direction so as to form an elongated line image in the main scanning direction near the light deflector 6, as described above. Accordingly, the light flux reflected at the light deflector 6 enters the third optical system (scanning and imaging optical system) 7 in the light flux that diverges in the sub scanning direction.

Since the light flux in the sub scanning direction of the scanning and imaging optical system 7 of the present embodiment has approximately zero power in the sub scanning direction of the scanning lens L1 nearest to the light deflector 6, it enters the scanning lens L2 nearest to the surface to be scanned 8a as a diverging light flux. In connection with this, when the lens surface nearest to the surface to be scanned of the sub scanning direction is made into a meniscus shape whose convex face is faced with the light deflector, and the reflected light at the lens surface is diverging light flux, it is possible to reduce the influence of ghost light on the surface to be scanned caused by the reflected light from the lens surface or between lenses reflected again by the light deflector 6.

Furthermore, by making the shape of the sub scanning direction of the scanning lens L2 nearest to the surface to be scanned into a meniscus shape whose convex is faced with the light deflector 6, the position of the rear principal point can be drawn out toward the light deflector 6, so that the magnification in the sub scanning direction between the light deflector 6 and the image is increased. As a result, with respect to the set lower limit of magnification in the sub scanning direction, the scanning lens L2 nearest to the surface to be scanned can be located in close to the surface to be scanned. Especially in the optical scanning device applicable in the tandem type image forming apparatus as will be described later, it becomes possible to increase the interval between the scanning lenses, so that the degree of freedom of lens layout can be improved.

Next, an embodiment of the optical scanning device according to claim 2 will be explained.

In one example that adopts the optical scanning device described in the first embodiment to a color image forming apparatus of, for example, tandem type, an optical scanning device having four light source devices (for example, four semiconductor lasers or a semiconductor laser array having four light emitting portions) corresponding to four photoconductors of cyan (C), magenta (M), yellow (Y) and black (K) will be explained with reference to FIGS. 2A, 2B and 2C. The light beams from the respective light sources (or light emitting portions) of four light source devices 11-1 to 11-4 are each coupled with a parallel light flux (weak converging light flux or diverging light flux) by the first optical system (for example, collimate lens). The coupled light beam passes through an aperture stop (aperture) 13 so as to have a desired beam spot diameter on the surface to be scanned, followed by a second optical system (for example, cylindrical lens) 14 to form an line image elongated in the main scanning direction near a single light deflector 15 serving as the deflecting unit. Then the four light fluxes scanned on the deflecting surface 15a of the light deflector 15 are introduced to a surface to be scanned 17a of a different photoconductor 17 by a scanning and imaging optical system 16 serving as the third optical system, where they scan at approximately constant speed and converge near the surface to the scanned. The scanning lens L1 nearest to the light deflector 15 of the scanning and imaging optical system 16 is so configured that a plurality of light beams traveling toward different surfaces to be scanned pass through.

Figure 2A:
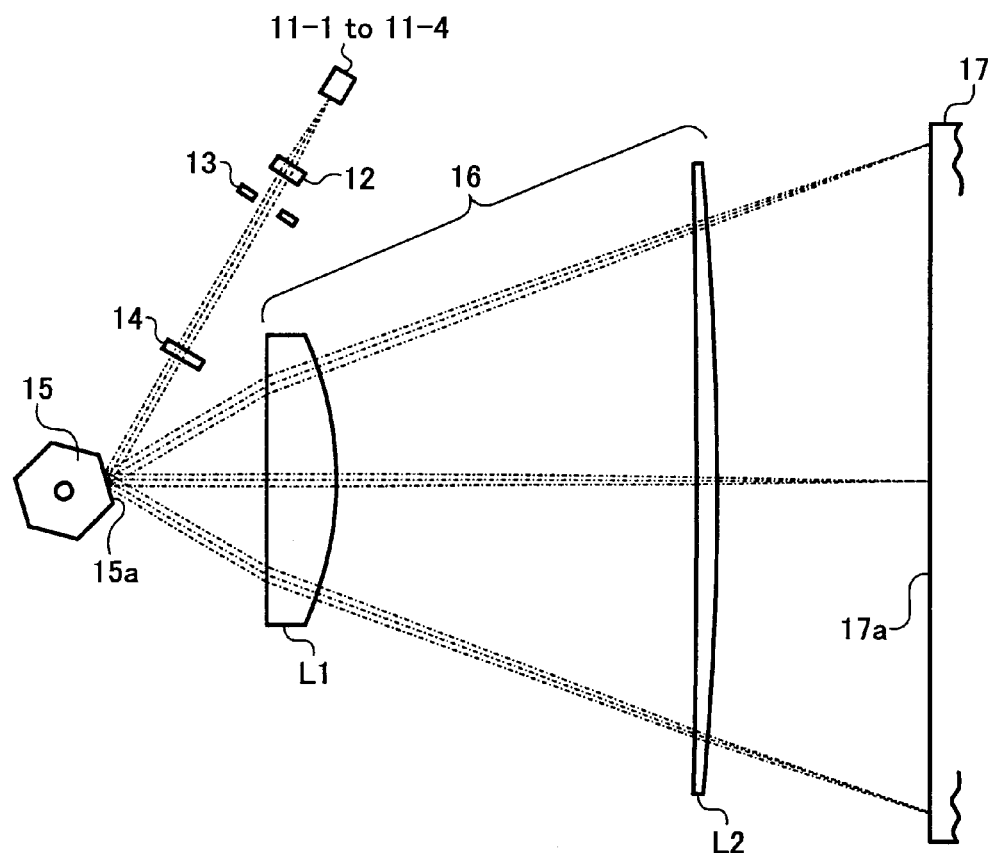
FIG. 2 is an explanatory view of a structure of an optical scanning device representing another embodiment of the present invention.

FIG. 2A is an exploded view of a main scanning section of the optical scanning device in which any return mirrors are omitted for convenience, and hence the optical path of the scanning beam is not changed by such return mirrors. FIG. 2B is a view of a sub scanning section of the optical scanning device in which the optical path from the light deflector 15 to the surface to be scanned 17a is shown and return mirrors are omitted. FIG. 2C is an example of the sub scanning section when the photoconductive surfaces of the four photoconductors 17C, 17M, 17Y and 17K for cyan (C), magenta (M), yellow (Y) and black (K) are optically scanned as the surface to be scanned, showing optical paths from the light deflector 15 to the four photoconductors 17C, 17M, 17Y and 17K including the return mirrors 18 and 19.

As shown in FIG. 2A, the light beams emitted from the light source devices (four light source devices arranged in parallel with the sub scanning direction) 11-1 to 11-4 corresponding to the respective colors each coupled with a parallel light flux (weak converging light flux or diverging light flux) by the first optical system (for example, collimate lens) 12. At this time, the beam form of each light beam coupled by the first optical system 12 is "identical beam form". This beam form may be "parallel beam" or "converging or diverging beam". The light flux of each light beam passes through the aperture stop 13 so as to have a desired beam spot diameter on the surface to be scanned, followed by the second optical system (for example, cylindrical lens) 14 to form an line image elongated in the main scanning direction near the single light deflector 15.

Although the optical sources are arranged in parallel in the sub scanning direction in the present embodiment, depending on the layout of the optical scanning device, a plurality of light source devices may be arranged in the main scanning direction at intervals by adopting such a configuration that the light beam is turned by a return mirror or the like.

Figure 2B:
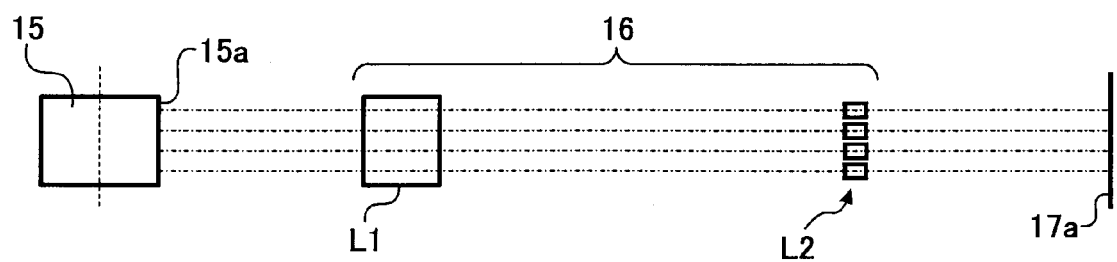
Figure 2C:
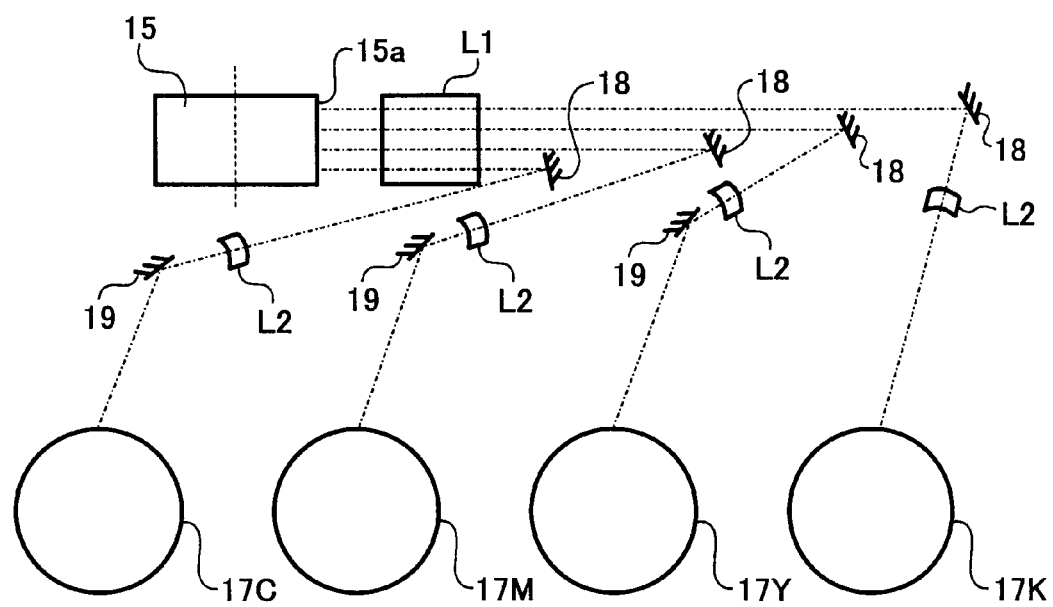

As shown in FIGS. 2A and 2B, the light fluxes scanned by the light deflector 15 pass through the scanning lenses L1 and L2 of the third optical system (scanning and imaging optical system) 16, each scan the corresponding surfaces to be scanned at approximately constant speed and converge near the surface to the scanned. At this time, as shown in FIG. 2B, the canning lens L1 of the third optical system (scanning and imaging optical system) 16 allows the light fluxes of light beams emitted from every light source device to pass through while aligning in the sub scanning direction. The surface to be scanned 17a is practically a photoconductive surface of the photoconductive medium 17, and in the present embodiment, "photoconductive surfaces of the photoconductive photoconductors 17C, 17M, 17Y and 17K" as shown in FIG. 2C, and is scanned in the up and down direction of FIG. 2A. That is, the up and down direction of FIG. 2A represents a main scanning direction (direction of main scanning line).

Since the scanning lens L1 nearest to the light deflector 15 of the third optical system (scanning and imaging optical system) 16 is configured to allow a plurality of light beams traveling toward different surfaces to be scanned to pass through, it is possible to reduce the difference in beam spot position in the main scanning direction between different surfaces to be scanned or between different colors, and suppress out of color registration and deterioration of image by color.

Furthermore, the scanning lens L1 nearest to the light deflector 15 has strong positive refractive power in the main scanning direction and corrects the speed uniformity. By letting a plurality of light fluxes traveling toward different surfaces to be scanned pass through this scanning lens L1, the difference in beam spot position in the main scanning direction due to process variation in scanning lenses becomes identical among different surfaces to be scanned, so that it is possible to prevent occurrence of out of color registration.

Furthermore, a polygon mirror serving as the light deflector 15 generates great heat at the motor or the substrate. As for the substrate, it is possible to reduce the temperature change within the optical box by putting the substrate outside the optical box, for example, however, the temperature rise due to heat generation of the motor still occurs. The heat caused by this temperature change transmits in the optical box, to cause temperature distribution in the scanning and imaging optical system, especially the scanning lens nearest to the polygon mirror. This temperature distribution results from disability to provide uniform temperature change in the scanning lens because of air flow in the optical box generated by the polygon mirror or shape of the scanning lens. As a result of this, in the tandem type color image forming apparatus which employs the opposite scanning system wherein light beams traveling toward different surfaces to be scanned pass through different scanning optical elements, the relative beam spot position in the main scanning direction at each surface to be scanned varies and hence the color changes in continuous printing.

However, in the optical scanning device according to the present embodiment, since the scanning lens L1 nearest to the light deflector 16 allows a plurality of light fluxes traveling toward different surfaces to be scanned to pass through, even if the scanning lens L1 has temperature distribution in the main scanning direction, the difference in beam spot position in the main scanning direction is identical among different surfaces to be scanned, so that it is possible to prevent color change and out of color registration from occurring in the case of continuous printing.

Next, explanation will be made on an embodiment of polygon scanning device that uses as one example of the light deflector a polygon mirror by referring to FIG. 3.

Figure 3A:
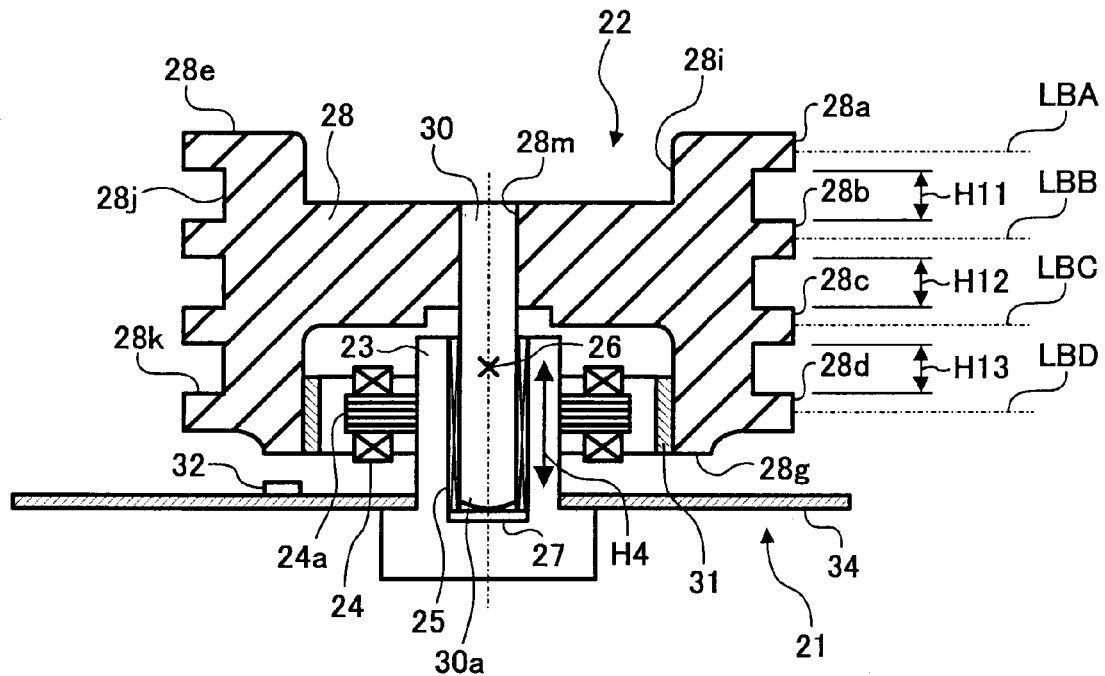
FIG. 3A is a section view of the polygon scanner and FIG. 3B is a top view of the polygon scanner.
Figure 3B:
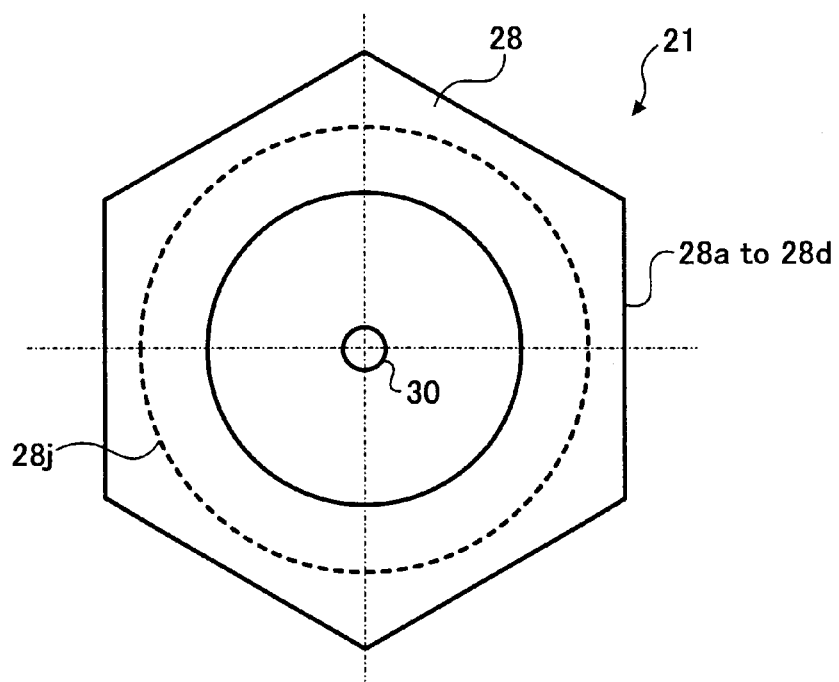

In FIG. 3, to polygonal members (rotary polygonal mirrors) 28a, 28b, 28c, 28d forming the distanced polygon mirror parts in the axial direction of a polygon scanning device 21, a plurality of laser beams LBA, LBB, LBC, LBD corresponding to different colors are respectively emitted to the axially arranged four surfaces, and deflected and scanned at high speed.

Next, the polygon scanning device 21 will be explained in detail. As shown in FIG. 3A, in this polygon scanning device 21, the upper periphery of a bearing shaft 30 formed of martensitic stainless steel is fitted by heating to the inner diameter of a polygon mirror 28 formed of aluminum of 99.9% or more purity and having the polygonal members 28a, 28b, 28c, 28d constituting the polygon mirror parts. Since martensitic stainless steel (for example SUS420J2) stands hardening and enables the surface to be hardened, as well as has excellent abrasion resistance, it is desirable as a material for the bearing shaft. In the lower part of the polygon mirror 28 is attached a rotor magnet 31 which forms a brushless motor of outer rotor type together with a stator core 24a (winding coil 24).

The reflection surfaces of the polygonal members 28a, 28b, 28c and 28d constituting the polygon mirror parts have enough axial length (thickness) to deflect a predetermined laser beam, and this axial length (thickness) is concretely set at 1 to 3 mm. This is because if the axial length is less than or equal to 1 mm, it is a thin sheet so that the rigidity during mirror process is low and the flatness is impaired. Whereas if the axial length is more than or equal to 3 mm, the inertia of the rotary member is large, so that the starting time is long.

A space portion 28j (axial length H11, H12, H13) has a diameter which is smaller than the diameter of the circumscribed circle of the polygonal members 28a, 28b, 28c and 28d, whereby the windage loss is reduced. The windage loss of the space portion 28j depends on the maximum diameter of circumscribed circle, and is significantly influenced by angular portions of the circumscribed circle. Therefore, it is preferred to round the angular portions. On the other hand, it is also possible to reduce windage loss by reducing the diameter of the inscribed circle, however, since the space portion is surrounded by the polygonal portions, the reducing effect is relatively small. In consideration of the processability, the difference D between the diameter of the circumscribed circle and the maximum outer diameter of the space portion 28j is set to less than or equal to 5 times, in relative to the axial length H11, H12 and h13 of the space portion 28j. If D is more than or equal to 5 times, the lifetime of the process bite is shortened and the process time is increased because the cutting amount is large.

On the other hand, the axial length H13 of the lowermost space portion 28j is set at 1 mm in consideration of the operability since it is necessary to apply an adhesive to a circumferential groove 28k at the time of balance correction. If it is less than or equal to 1 mm, the tip end of the adhesive applicator and the protuberant adhesive come into contact with the polygon mirror to damage or soil the mirror portion. Also the circumferential groove 28k may possibly be provided on the opposite surface (on the side of lower surface 28g). However, in the case of applying an adhesive on the surface opening downward, it is necessary to remove the rotor 22 from the bearing 25 and apply the adhesive in the condition that the rotor 22 is fixed in upright position. This requires not only a complicated process but also detachment step from the bearing 25, leading the problems that oil scattering or the like occurs in each case and deterioration of the bearing is induced.

In this context, the explanation was made on the example in which four reflection surfaces of the polygon scanning device are provided for the respective colors, however, the reflection surfaces may be two or one.

Next, an embodiment of the optical scanning device according to claim 3 will be explained.

In the optical scanning device having the configuration of FIG. 2 explained in the second embodiment, the plurality of beams traveling toward different surfaces to be scanned are caused to pass through the scanning lens L1 nearest to the light deflector 15 in approximately parallel with the sub scanning direction. Therefore, when the incident light fluxes deviate in the sub scanning direction, the speed uniformity is not deteriorated. Additionally, it is possible to prevent the imaging performance of the main scanning direction from deteriorating. Furthermore, it is also possible to prevent the scanning line from curving.

In the example of FIG. 2, the explanation was made for the example wherein the scanning and imaging optical system 16 and the surface to be scanned 17a are positioned on one side of the light deflector (for example polygon mirror) 15, and the light fluxes of light beams corresponding to the four photoconductors 17C, 17M, 17Y and 17K are caused to pass from the light deflector 15 to the first scanning lens L1 while aligned in the sub scanning direction. Likewise, the scanning and imaging optical system and two photoconductors (surfaces to be scanned) may be symmetrically placed on both sides of the light deflector (for example polygon mirror) 15, and the light fluxes of light beams traveling toward two different surfaces to be scanned may be caused to pass from the light deflector 15 to the first scanning lens L1 while aligned in the sub scanning direction so as to handle the four surfaces to be scanned (photoconductors).

Next, an embodiment of the optical scanning device according to claim 4 will be explained.

Figure 4:
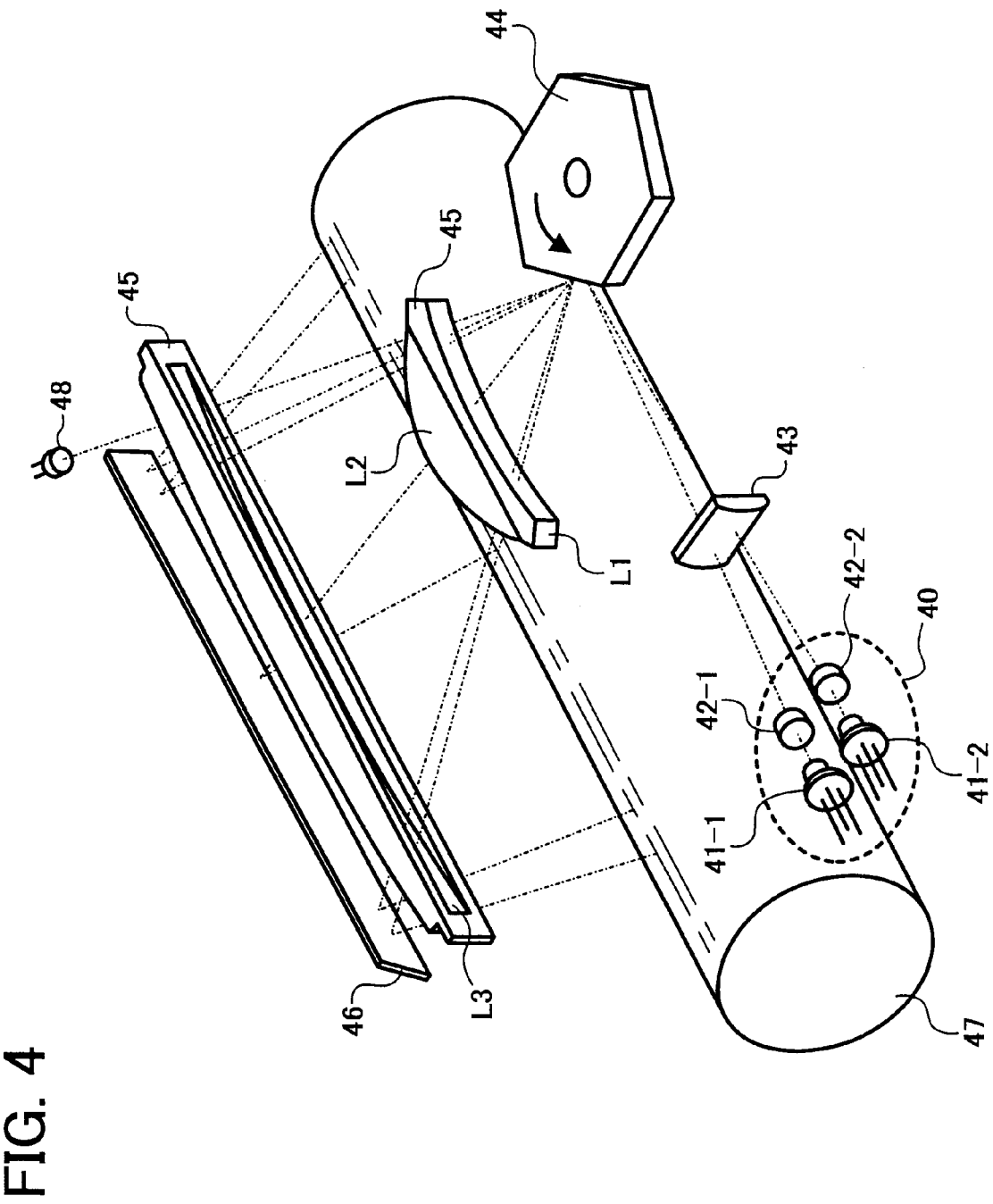
FIG. 4 is a schematic perspective view of an optical scanning device representing still another embodiment of the present invention.

FIG. 4 is a schematic perspective view of an optical scanning device showing the fourth embodiment. In FIG. 4, this optical scanning device has a multi-beam light source 40 which emits two light beams towards one surface to be scanned (for example, photoconductive surface of a photoconductor) 47, and the light beams from the semiconductor lasers 41-1, 41-2 of the multi beam light source 40 each are coupled with parallel light fluxes (which may be weak converging flux or diverging flux) by first optical systems (for example, collimate lens) 42-1, 42-2. The coupled light beams pass through a second optical system (for example, cylindrical lens) 43, and form elongated line images in the main scanning direction near a light deflector (for example, polygon mirror) 44 serving as the deflecting unit. Then the light beams scanned on the deflecting surface of the light deflector 44 are introduced onto the surface to be scanned (for example, photoconductive surface of the photoconductor) 47 by a scanning and imaging optically system 45 and a return mirror 46 which embodies the third optical system where they scan the surface to be scanned 47 at generally constant speed and condenses near the surface to be scanned.

In the optical scanning device configured as described above, as shown in FIG. 4, every light beam emitted from the plurality of semiconductor lasers 41-1, 41-2 of the multi beam source 40 preferably intersects near the deflecting surface of the light deflector (for example, polygon mirror) 44 in the main scanning direction. The reasons will be described below.

Figure 5A:
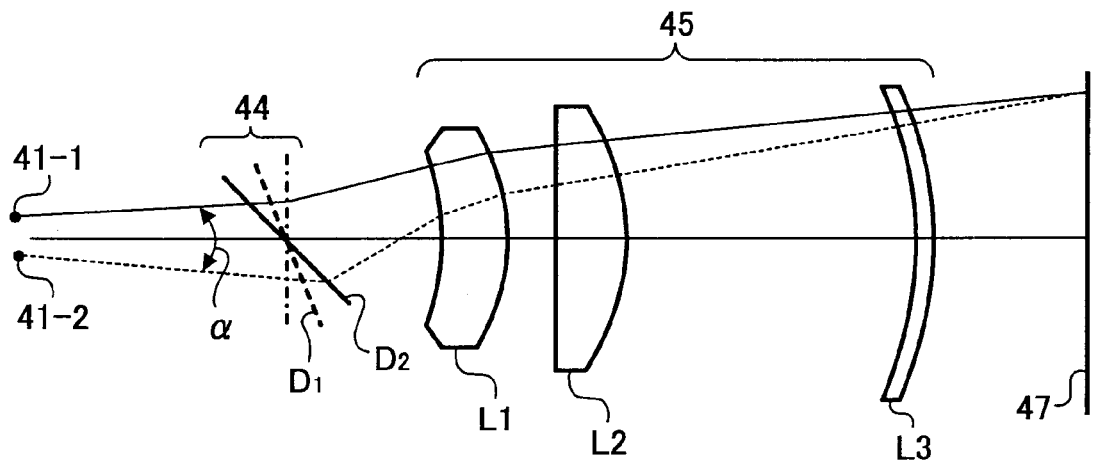
FIG. 5 is an explanatory view of an optical system of the optical scanning device shown in FIG. 4.
Figure 5B:
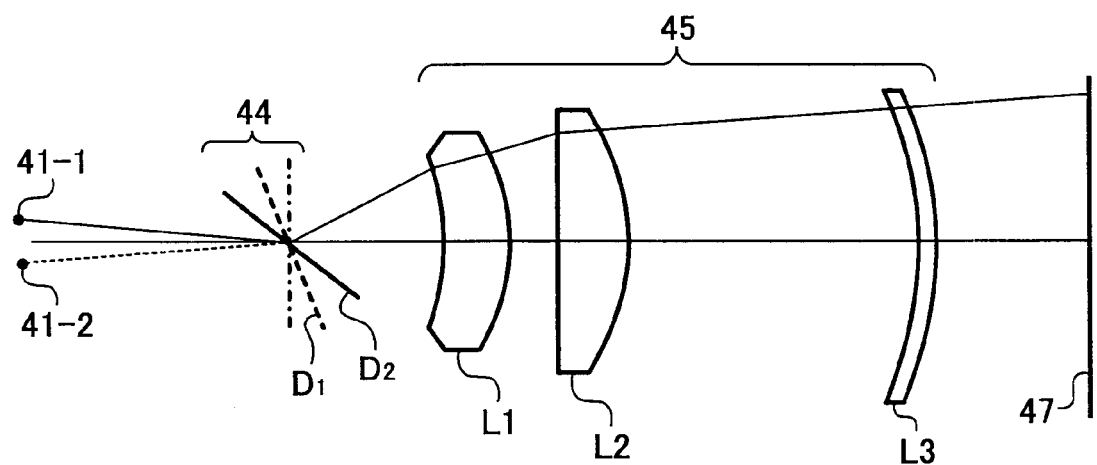

FIG. 5 represents a main scanning section of optical systems of the optical scanning device shown in FIG. 4, in which the first optical system, the second optical system and the return mirrors are omitted for convenience of illustration. FIG. 5A represents an example in which the light beans from the two semiconductor lasers 41-1, 41-2 enter the deflecting surface of the polygon mirror 44 while separated at a certain angle α. FIG. 5B represents an example in which the light beams from the semiconductor lasers 41-1, 41-2 intersect near the deflecting surface of the polygon mirror 44 in the main scanning direction.

In FIG. 5A, $D_1$ denotes the position of the deflecting surface of the polygon mirror 44 when the light beam emitted from the semiconductor laser 41-1 reaches a certain image height in the surface to be scanned 47, and $D_2$ denotes the position of the deflecting surface of the polygon mirror 44 when the light beam emitted from the semiconductor laser 41-2 reaches the same image height in the surface to be scanned 47. The respective light beams are separated at a certain angle α when they enter the polygon mirror 44. Therefore, a time delay arises in the positions of deflecting surface $D_1$ and $D_2$ to reach the same image height. In the case of FIG. 5A, the two light beams travel largely different optical paths, however, when the light beams from the semiconductor lasers 41-1, 41-2 intersect near the deflecting surface of the polygon mirror 44 in the main scanning direction as shown in FIG. 5B, the two light beams travel the same optical path.

When the two light beams pass through different positions in each scanning lens of the scanning and imaging optical system 45 as shown in FIG. 5A, they obviously receive different optical effects, and the two light beams reaching the same image height in the main scanning direction on the surface to be scanned 47 have different optical characteristics such as aberration. In particular, the scanning line pitch largely influences on the image height-to-image height difference.

In consideration of the above, by making the two light beams intersect near the polygon mirror 44 as shown in FIG. 5B, the two light beams travel almost the same optical path in the main scanning direction of each scanning lens of the scanning and imaging optical system 45 when reaching the same image height in the main scanning direction of the surface to be scanned, so that it is possible to effectively reduce curving of the scanning line. Furthermore, the variation in writing position in the main scanning direction between each light beam due to variation of components disposed on the image surface side from the polygon mirror 4 is almost the same amount in all light beams, so that the difference in writing position in the main scanning direction between each beam is suppressed. Furthermore, by making every light beam to be imaged at the same image height pass through almost the same position in the main scanning direction of the scanning and imaging optical system 45, it is possible to suppress the influence of the aberration of the scanning lenses constituting the scanning and imaging optical system 45, and make the imaging position in the main scanning direction coincide among each beam with accuracy. Even if a delay time which is common to every beam is set after detecting synchronization by a synchronous detector 48, it is possible to regulate the positional difference in the main scanning direction at the image height where the writing starts.

Also, by making the setting as shown in FIG. 5B, it is possible to minimize the radius of the inscribed circle of the polygon mirror 44.

In the description of the present embodiment, the explanation was made by exemplifying the multi-beam light source. Also when the light beams traveling toward different surfaces to be scanned are deflected by the same reflection surface of the polygon mirror, the similar effect can be obtained by making each light beam intersect near the deflecting surface of the polygon mirror 44 in the main scanning direction.

In addition, the difference in intersection position on the main scanning section of each light beam is preferably set at smaller than or equal to 0.5 mm on the deflecting surface of the polygon mirror.

Next, an embodiment of the optical scanning device according to claim 5 or 6 will be explained.

In the optical scanning devices as described in the first to fourth embodiments, when the scanning and imaging optical system consists of two scanning lens as shown in FIG. 1 or FIG. 2, by designing the scanning lens on the side of the surface to be scanned to be a negative meniscus lens whose convex surface is faced with the surface to be scanned, it is possible to keep the optical magnification constant with respect to the image height.

When at least two surfaces in the sub scanning direction are designed by changing the radius of curvature of the sub scanning section in the main scanning direction so that the center line of curvature obtained by connecting the center of curvature in the sub scanning section in the main scanning direction is different from the non-arc shape of the main scanning direction in the main scanning section, and these two lens surfaces are bent to "adjust the principal point position of the sub scanning direction", the longer the interval of two surfaces, the larger the change in principal point position can be ensured. In brief, the lateral magnification of the sub scanning direction can be corrected between image heights.

In the present embodiment, however, the scanning and imaging optical system consists of two scanning lenses for the purpose of reducing the cost of the optical scanning device, and in the sub scanning direction of the scanning lens nearest to the light deflector, the refractive power is approximately zero. Accordingly, these two surfaces serve as the first surface and the second surface of the scanning lens nearest to the surface to be scanned. In this case, it is difficult to desirably correct the lateral magnification of the sub scanning direction between image heights.

In the optical scanning device of the present embodiment, by designing the main shape of the scanning lens on the side of the surface to be scanned to be a negative meniscus lens whose convex surface is faced with the surface to be scanned, the optical magnification is kept constant with respect to the image height.

In addition, since the peripheral image heights have longer optical paths compared to the center image height, the principal point position in a peripheral image height should be shifted toward the light deflector in relation to the center image height in order to keep the lateral magnification in the sub scanning direction identical to that of the center image height. For achieving this, the scanning lens on the side of the surface to be scanned has such a shape that the convex surface is faced with the surface to be scanned; the principal point position at the peripheral image height is located on the side of the light deflector with respect to the center image height; and using the surface having radius of curvature in the section of the sub scanning direction which varies in the main scanning direction so that the center line of curvature obtained by connecting centers of curvature in the sections of the first surface and the second surface of the scanning lens nearest to the surface to be scanned in the main scanning direction represents a different curve from the non-arc curve shape of the main scanning direction in the section of the main scanning direction, two lens surfaces are bent to "adjust the principal point position of the sub scanning direction". As a result, it is possible to keep the optical magnification with respect to the image height constant.

Furthermore, in the optical scanning device of the present embodiment, when lateral magnification along the sub scanning direction on the optical axis between the deflecting surface of the light deflector and the surface to be scanned is denoted by $\beta 0$ and the lateral magnification along the sub scanning direction of any image height is denoted by $\beta h$, it is preferred that the following condition expression (1) is satisfied:

$$0.9<|\beta h/\beta 0|<1.1 \qquad (1)$$

Furthermore, by making the optical magnification with respect to the image height constant, when the surface to be scanned is simultaneously scanned with a plurality of light beams by multi-beam configuration, the beam pitch along the sub scanning direction between the plurality of beams is kept constant, so that it is possible to provide an optical scanning device capable of handling increased density and increased speed realized by the multi-beam configuration.

Next, an embodiment of the optical scanning device according to claim 7 will be explained.

In the optical scanning devices described in the first to fifth embodiment, when the lateral magnification along the sub scanning direction on the optical axis between the deflecting surface and the surface to be scanned is denoted by $\beta 0$, it is preferred that the following condition expression (2) is satisfied.

$$0.2<|\beta 0|<0.6 \qquad (2)$$

That is, if $|\beta 0|$ is less than the lower limit of the condition expression (2), when the lateral magnification $\beta 0$ of the sub scanning direction on the optical axis between the deflecting surface and the surface to be scanned is set at large value with respect to the target beam spot diameter, it is necessary to set the aperture diameter smaller. This leads the problem of short of light intensity or the problem of deterioration of the beam spot diameter under the influence of the diffraction in the aperture becomes significant (see Japanese Patent Application Laid-Open No. 7-110451 for the influence of the diffraction). Furthermore, if $|\beta 0|$ is more than the upper limit of the condition expression (2), when a mirror or the like is disposed after the scanning lens nearest to the light deflector in order to separate the optical path into optical paths of respective colors traveling to the surface to be scanned, it is necessary to increase the whole length of the optical path, so that the apparatus size increases. Therefore, the internal layout of the optical scanning device becomes difficult. Therefore, for solving these problems, it is preferred that the condition expression (2) is satisfied.

Next, an embodiment of the optical scanning device according to claim 8 will be explained.

In the optical scanning devices described in the first to sixth embodiments, when the distance from the base point of the deflecting surface to the surface to be scanned on the optical axis is denoted by "L", and the largest interval between a plurality of scanning lenses on the optical axis is denoted by "a", it is preferred that the following condition expression (3) is satisfied.

$$0.3<|a/L|<0.6 \qquad (3)$$

Usually, a mirror or the like for separating the optical path into those corresponding to the respective colors traveling toward the surface to be scanned is provided within the largest interval on the optical axis between a plurality of scanning lenses. At this time, if $|a/L|$ is less than the lower limit of the condition expression (3), the largest interval between the plurality of scanning lenses on the optical axis is too short to dispose the mirror or the like for separating the optical path into those corresponding to the respective colors traveling toward the surface to be scanned.

On the other hand, if $|a/L|$ is more than the upper limit of the condition expression (3), the scanning lens that has strong refraction power at least in the main scanning direction and corrects the speed uniformity with respect to the scanning lens on the side of the surface to be scanned approaches the side of the deflecting surface of the light deflector. As a result of this, the angle of field for scanning the image area on the surface to be scanned is narrowed, so that the scanning time of image area is shorter compared to the case that the angle of field is wide. Reduction of time required for scanning the image area will cause the problem that ON-OFF switching of the light source such as semiconductor laser cannot respond to the writing density (response speed is insufficient). For solving these problems, it is preferred that the condition expression (3) is satisfied.

Next another embodiment of the optical scanning device will be explained.

According to this embodiment, in the optical scanning devices described in the first to seventh embodiments, at least one of the scanning lenses constituting the scanning and imaging optical system is formed of plastic (resin). That is, by forming the scanning lens constituting the scanning and imaging optical system of plastic, when a special surface represented by aspheric surface is formed on the optical element of the optical scanning device for the purpose of improving the scanning characteristics, it can be formed with ease and at low costs. In particular, in the case of the tandem type image forming apparatus as described above, since the number of optical elements to be used is large, cost reduction effect by using the resin optical elements is significant.

Conventionally, an optical scanning device entailed the problem as follows. When the internal temperature of an optical box rises due to the deflector that generates great heat such as polygon mirror, the heat will not uniformly transmit due to the air flow created by rotation of the polygon mirror or the shape variation inside the optical box, so that the internal temperature of the optical box has temperature distribution. Therefore, when optical elements formed of resin are used in such an optical scanning device, since resins have larger coefficient of thermal expansion than glass and hence the shape largely changes with temperature change, so that characteristics of the optical elements formed of resin will change. Also in the scanning lens, the temperature does not change uniformly because of difference in manner of heat transmission, difference in shape of lens (difference in installation area in the optical box) and the like, so that temperature difference arises by the position within the scanning lens. This temperature difference largely influences on the optical performance, and out of color registration often occurs because the speed uniformity differs among different colors.

However, according to the present embodiment, since a plurality of light beams traveling toward different surfaces to be scanned pass through the scanning lens nearest to the deflecting unit of the scanning and imaging optical system, the variation in speed uniformity arises in the same manner in each color, so that occurrence of out of color registration is prevented. Therefore, even when all of the scanning lenses including the scanning lens nearest to the deflecting unit are formed of plastic, it is possible to desirably correct the field curvature in the main and sub scanning directions to realize the stability of the light spot, while desirably keeping the "conjugating function" and "speed uniformizing function" in the scanning and imaging optical system, and further it is possible to provide an optical scanning device capable of preventing out of color registration and color change from occurring.

Next, another embodiment of the image forming apparatus will be explained.

Figure 6:
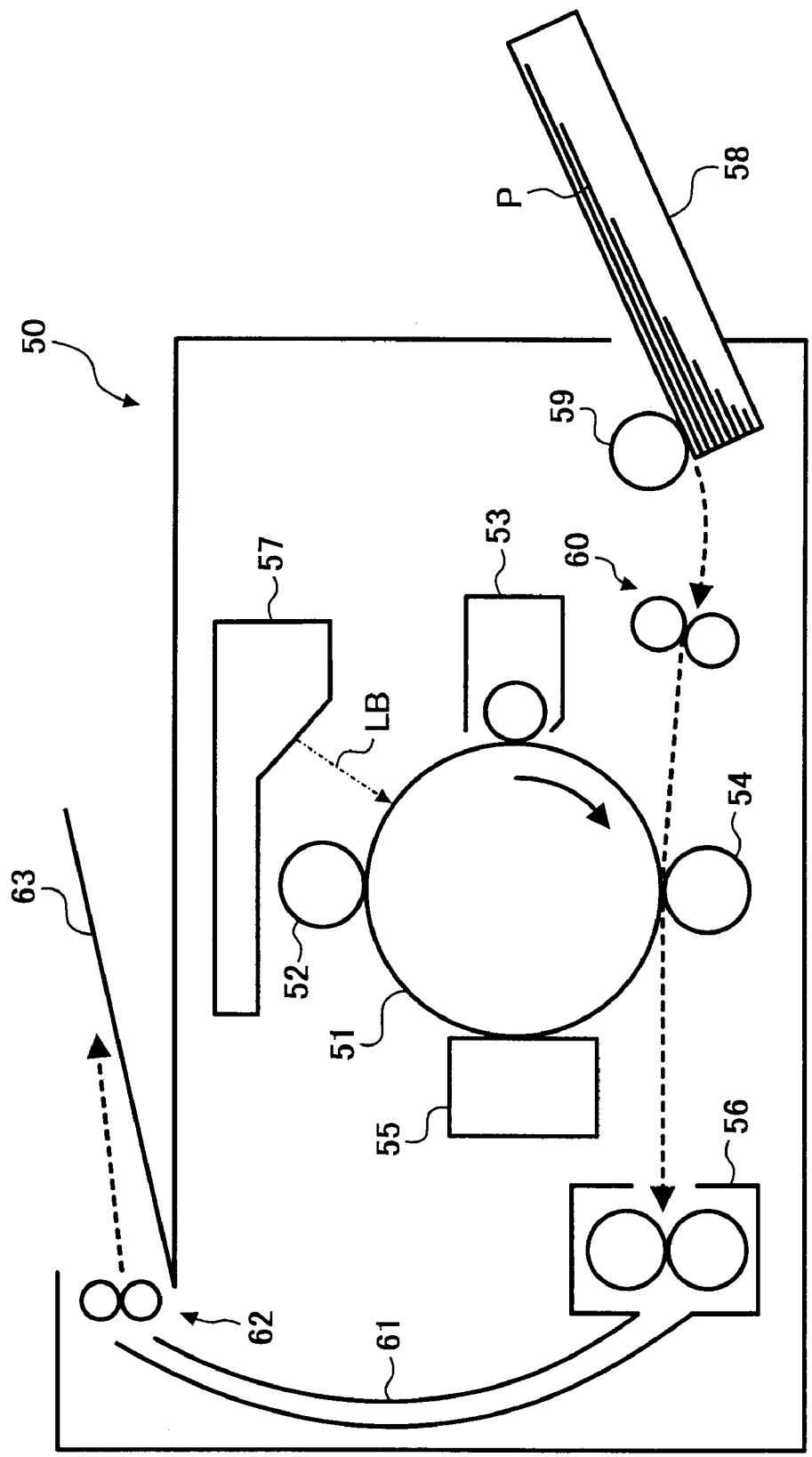
FIG. 6 is a schematic configuration view of a laser printer representing one embodiment of an image forming apparatus according to the present invention.

As one example of the image forming apparatus, a laser printer having a configuration shown in FIG. 6 will be used for explanation. A laser printer 50 has a "cylindrically formed photoconductive photoconductor" serving as an image bearing member 51. Around the image bearing member 51 are disposed a charging roller 52 serving as a charging unit, a developing device 53 serving as a developing unit, a transfer roller 54 serving as a transferring unit and a cleaning device 55 serving as a cleaning unit. The charging unit may be implemented by a corona charger or a charging brush in place of the charging roller 52. Furthermore, as an optical writing unit that forms a latent image corresponding to image information on the charged image bearing member 51, an optical scanning device 57 that conducts optical scanning by a laser beam LB is provided so as to allow "light exposure by optical writing" between the charging roller 52 and the developing device 53. As such an optical scanning device 57, for example, the optical scanning device having the configuration as illustrated in the first embodiment and the fourth embodiment can be used.

In FIG. 6, the reference numeral 56 denotes a fixing device, 58 denotes a paper feeding cassette, 59 denotes a paper feeding roller, 60 denotes a pair of registration rollers, 61 denotes a conveying path, 62 denotes a pair of paper discharging rollers, 63 denotes a paper discharging tray and "P" denotes recording paper serving as a recording material.

In forming an image, the image bearing member 51 which is a photoconductive photoconductor is rotated at constant speed in counterclockwise direction, and the surface of this image bearing member 51 is uniformly charged by the charging roller 52. On this surface is formed an electrostatic latent image in response to the light exposure by the optical writing of the laser beam LB of the optical scanning device 57. The formed electrostatic latent image is a so-called "negative latent image" in which image part is exposed to the light.

This electrostatic latent image is inversely developed by the developing device 53 to be visualized, and a toner image is formed on the image bearing member 51.

The paper feeding cassette 58 accommodating recording paper P is detachable from the image forming apparatus 50, and in the attached state as shown in the drawing, the uppermost sheet of the accommodated recording paper P is fed by the paper feeding roller 59, and the fed sheet of recording paper P is captured at its leading end by the registration roller pair 60. The registration roller pair 60 sends the sheet of recording paper P to a transferring portion which is a nip portion between the image bearing member 51 and the transferring roller 54 in timing with the movement of the toner image on the image bearing member 51 to the transferring position. The sent sheet of recording paper P is overlapped with the toner image on the image bearing member 51 in the transferring portion, and the toner image is electrostatically transferred by the transfer roller 54. The sheet of recording paper P on which the toner image is transferred is then sent to the fixing device 56 where the toner image is fixed, and travels the conveying path 61, and discharged onto the paper discharging tray 63 by the paper discharging roller pair 62.

The surface of the image bearing member 51 after transferring of the toner image is cleaned by the cleaning device 55 for removing the remaining toner, paper powder and the like.

As described above, according to the present embodiment, in the image forming apparatus wherein a latent image is formed on the image bearing member 51 by optical scanning, and the latent image is visualized to obtain desired recording image, for example, the optical scanning device having the configuration in FIG. 4 as illustrated in the fourth embodiment is used as the optical scanning device for performing optical scanning of the image bearing member 51. Furthermore, since the image bearing member 51 is a photoconductive photoconductor, an electrostatic latent image is formed by its uniform charging and optical scanning, and the formed electrostatic latent image is visualized as a toner image. This toner image is then transferred to the recording paper P and fixed to come out as a desired image.

Next, an embodiment of the image forming apparatus according to claim 12 will be explained.

Figure 7:
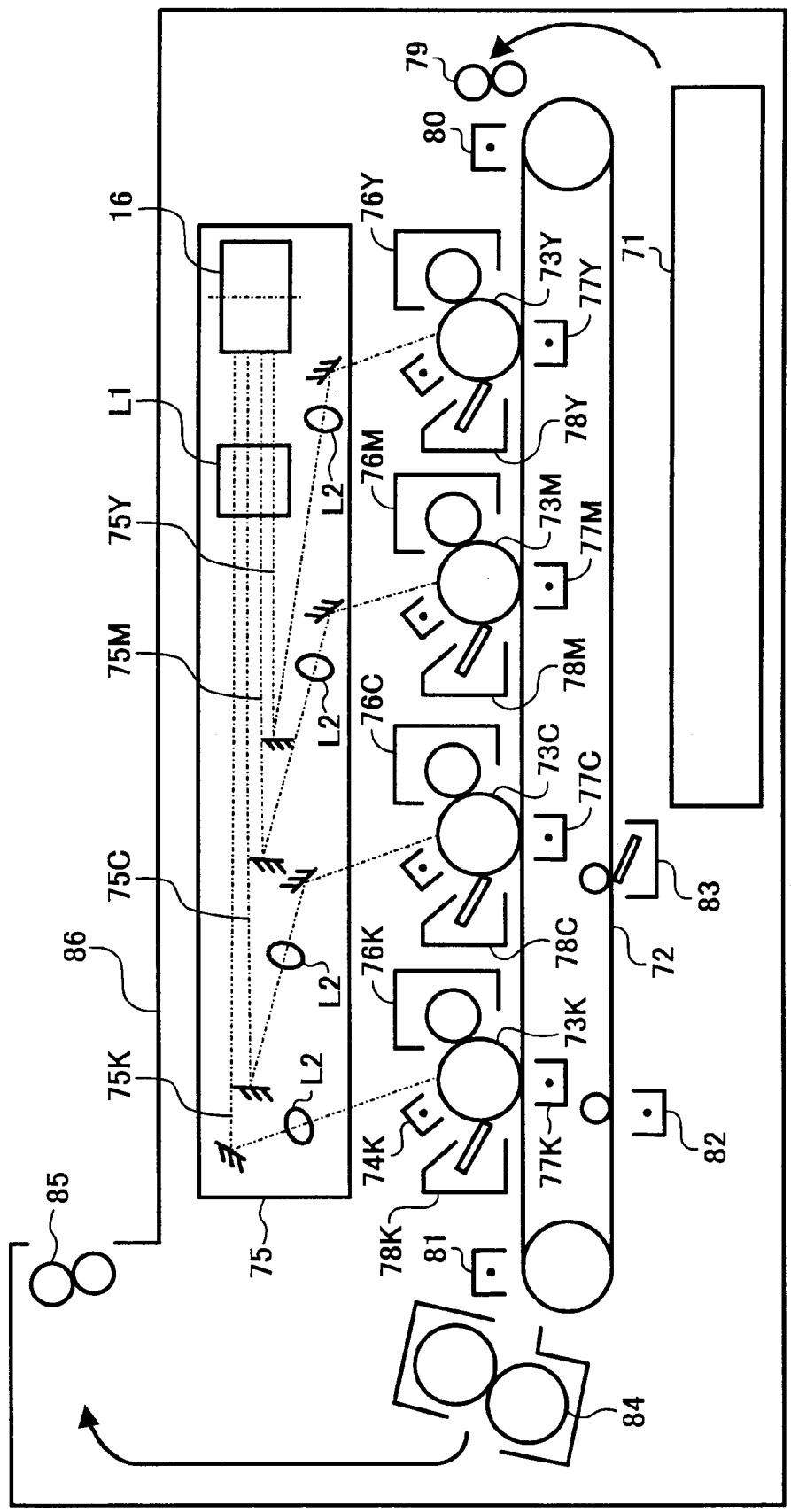
FIG. 7 is a schematic configuration view of a tandem type full color laser printer representing another embodiment of the image forming apparatus according to the present invention.

The explanation will be made while exemplifying a tandem type full color laser printer having the configuration as shown in FIG. 7 as the image forming apparatus.

A conveyer belt 72 for conveying recording paper (not shown) fed from a paper feeding cassette 71 is provided in the horizontal direction in the lower part of the apparatus. On this conveyer belt 72 are disposed at constant intervals a photoconductor 73Y for yellow Y, a photoconductor 73M for magenta M, a photoconductor 73C for cyan, and a photoconductor 73K for black K in this order from the upstream side. In the following descriptions, the characters Y, M, C and K are appropriately added to reference numerals for discrimination.

These photoconductors 73Y, 73M, 73C, 73K all have the same diameter, and around which process members for executing image formation according to the electrophotographic process are sequentially disposed. In the case of the photoconductor 73Y for yellow, for example, a charging charger 74Y, a light exposure part of an optical scanning optical system 75Y, a developing device 76Y, a transferring charger 77Y, a cleaning device 78Y and the like are disposed in this order around the photoconductor 73Y. This also applies to the other photoconductors 73M, 73C and 73K. That is, in the present embodiment, the four photoconductors 73Y, 73M, 73C and 73K constitute surfaces to be scanned prepared for the respective colors, and optical scanning optical systems 75Y, 75M, 75C and 75K of the optical scanning device 75 are provided in one-to-one correspondence. The optical scanning device 75 has generally the same configuration as that of the optical scanning device explained in the second embodiment, for example, and as shown in FIG. 2C, the scanning lens L1 on the side of the light deflector 16 of the scanning and imaging optical system is commonly used by Y, M, C and K.

Also around the conveyer belt 72 are provided a registration roller 79 and a belt charging charger 80 on the upstream side of the photoconductor 75Y, and a belt separating charger 81, a belt neutralizing charger 82, a belt cleaning device 83 and the like in this order on the downstream side of the photoconductor 75K. Also the downstream side in the conveying direction of the belt separating charger 81 is provided a fixing device 84. The fixing device 84 is connected to the paper discharging roller 85 by a conveying path (not shown) so that a transferred sheet of paper after fixing is conveyed to the paper discharging tray 86.

In such a schematic configuration, for example, when the apparatus operates in full color mode (multicolor mode), electrostatic latent images are formed on the photoconductors 73Y, 73M, 73C and 73K based on image signals for the respective colors Y, M, C and K by optical scanning of light beams by the respective optical scanning optical systems 75Y, 75M, 75C and 75K of the optical scanning device 75. These electrostatic latent images are developed by color toner at the corresponding developing devices 76Y, 76M, 76C and 76K to become toner images of respective colors. These toner images are then overlapped by sequential transfer onto the recording paper that is conveyed on the conveyer belt 72 while electrostatically adsorbed thereon. The recording paper having transferred images is then separated from the conveyer belt 72 and conveyed to the fixing device 84 where it is fixed as a full color image, after which the recording paper is discharged to the paper discharging tray 86 through the paper discharging roller 85.

In the image forming apparatus having the above configuration, when the optical scanning device 75 including the four optical scanning optical systems 75Y, 75M, 75C and 75K is implemented by the optical scanning devices explained in the second and the third embodiments, for example, it is possible to realize an image forming apparatus capable of ensuring high quality image reproducibility without causing out of color registration.

Furthermore, in the image forming apparatus of the above configuration, the light beam that travels toward one photoconductor (surface to be scanned) is not necessary one, but may be a plurality of beams (multi beam as shown in FIG. 4, for example).

EXAMPLES

Next, more concrete examples of the optical scanning device according to the present invention will be explained. The optical system of the optical scanning device has such an arrangement as shown in FIG. 1 (return mirror omitted) or FIG. 2A.

Numerical Example 1

Optical System Preceding Light Deflector

TABLE 1

| Surface number | RY(mm) | RZ(mm) | X(mm) | N | Note |
|---|---|---|---|---|---|
| Optical source | — | — | 0.55 | — | Semiconductor laser array |
| 1 | ∞ | ∞ | 0.3 | 1.514 | Cover glass |
| 2 | ∞ | ∞ | 23.4 | — | — |
| 3* | ∞ | ∞ | 4.5 | 1.690 | Coupling lens |
| 4* | −18.49 | −18.49 | 5.0 | — | — |
| 5 | ∞ | ∞ | 150.15 | — | Aperture stop |
| 6 | ∞ | 48.0 | 3.0 | 1.514 | Cylindrical lens |
| 7 | ∞ | ∞ | 93.57 | — | — |
| 8 | — | — | — | — | Deflecting surface |

RY: Radius of curvature in main scanning direction
RZ: Rradius of curvature in sub scanning direction (center of lens)
N: Refractive index at used wavelength (655 nm)
X: Distance in optical axis direction In FIG. 1, the surface marked with * is a coaxial aspheric surface. Although numerical values are not shown, the wave aberration injecting from the coupling lens (collimate lens) is desirably corrected. In addition, the light deflector is a polygon mirror having A dimension of 18 mm and six faces.

[Optical System Following Light Deflector]
β0 (lateral magnification of sub scanning direction between the light deflector and the surface to be scanned): 0.51
βh/β0: 0.98 (value at the image height where the difference in magnification from that of the center image height is largest)

TABLE 2

| Surface number | RY(mm) | RZ(mm) | X(mm) | N | note |
|---|---|---|---|---|---|
| Deflecting surface | ∞ | ∞ | 76.63 | — | Deflecting surface |
| 1* | −801.412 | ∞ | 23.0 | 1.527 | Scanning and imaging lens L1 |
| 2* | −119.317 | ∞ | 146.31 | — | — |
| 3** | −1050.624 | 30.223 | 3.06 | 1.527 | Scanning and imaging lens L2 |
| 4** | −2238.605 | 98.404 | 121.0 | — | — |
| 5 | — | — | — | — | Surface to be scanned |

In Table 2, each surface marked with * is non-arc shaped in the main scanning direction and flat surface in the sub scanning direction. The surface shape of lens is given by the following expression:

$$X(Y,Z) = Y^2 Cm / \{1 + \sqrt{1-(1+K)(YCm)^2}\} + A Y^4 + B Y^6 + C Y^8 + D Y^{10} + E Y^{12} + F Y^{14} + Cs(Y)Z^2 / \{1 + \sqrt{1-(Cs(Y)Z)^2}\}$$

wherein $$Cm = 1/RY$$

and $$Cs(Y) = 1/RZ.$$

In the expression, $Y^2$ represents square of Y ($=Y^2$) and others have the similar meanings. On the other hand, each surface marked with ** is non-arc shaped in the main scanning direction and has a radius of curvature in the sub scanning direction that continuously changes depending on the height of the lens. Each surface shape is given by the above expression. In this case Cs(Y) is given by the following expression:

$$Cs(Y) = 1/Rz + aY + bY^2 + cY^3 + dY^4 + eY^5 + fY^6 + gY^7 + hY^8 + iY^9 + jY^{10} + kY^{11} + lY^{12}$$

The aspheric coefficients in the present example are shown in Table 3. In Table 3, E+01 represents $10^{+01}$ and E−01 represents $10^{-01}$, and others have the similar meanings.

Figure 8:
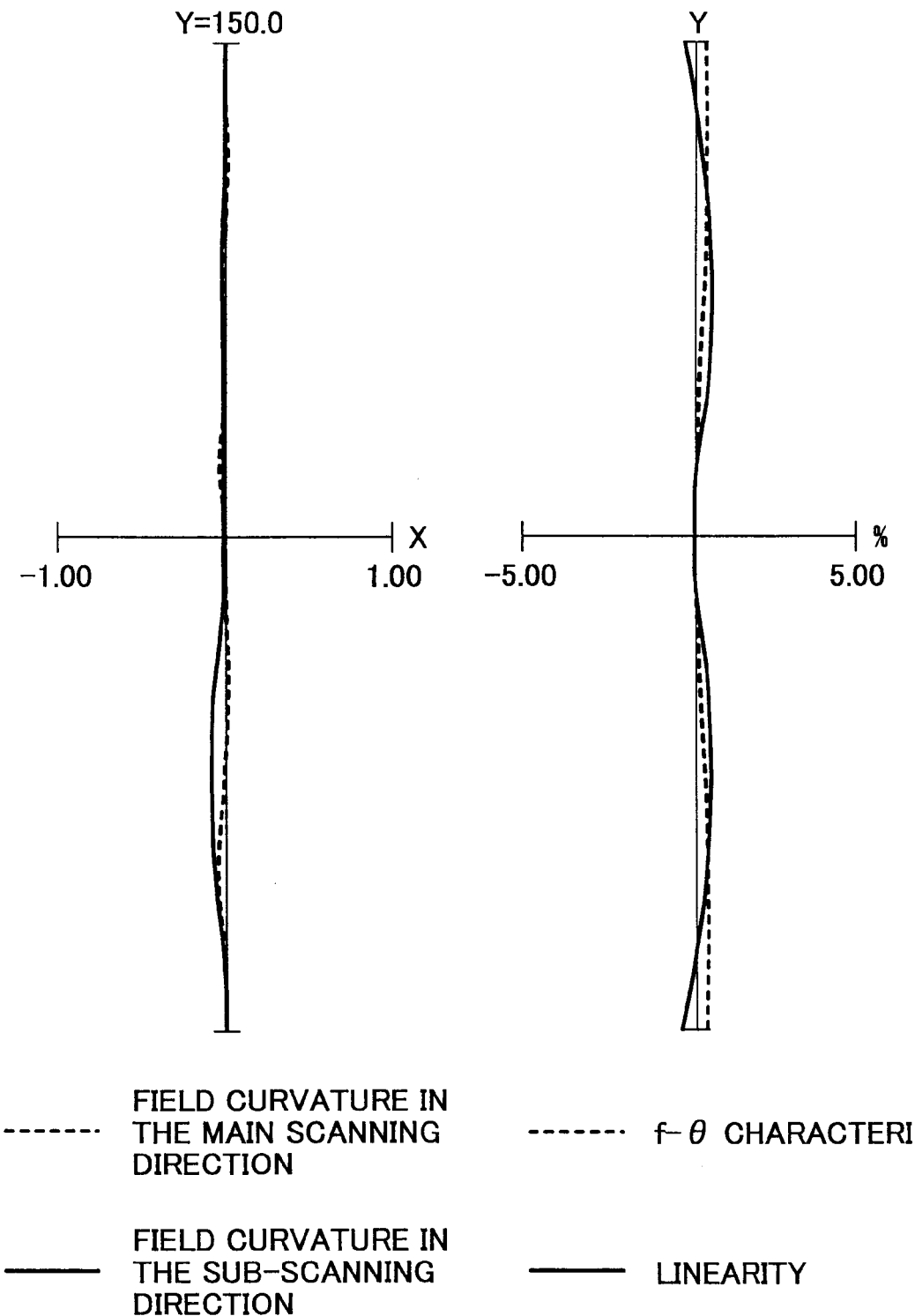
FIG. 8 is an aberration chart showing characteristics of the optical scanning optical system of Numerical example 1.

In the present optical system, 1.9 mm thick soundproof glass (refractive index 1.511) is inserted, and the soundproof glass is placed at an angle in the 8 deg deflecting surface. The aberration chart of Numerical example 1 is shown in FIG. 8.

TABLE 3

|   | First surface | Second surface | Third surface | Fourth surface |
|---|---|---|---|---|
| RY | −801.412 | −119.317 | −1050.624 | −2238.605 |
| K | 1.908E+01 | 4.603E−01 | 4.248E+01 | −1.208E+03 |
| A | −1.466E−07 | −4.650E−08 | 2.166E−08 | 3.078E−09 |
| B | 3.771E−11 | 2.232E−11 | 1.748E−12 | −8.738E−13 |
| C | −4.958E−15 | −3.241E−15 | −1.635E−16 | 1.456E−16 |
| D | −5.051E−19 | 6.931E−20 | 1.343E−21 | −1.442E−20 |
| E | 1.489E−22 | 1.072E−22 | 1.599E−25 | 4.420E−25 |
| F | −1.331E−26 | −2.441E−26 | — | — |
| RZ | ∞ | ∞ | 30.223 | 98.404 |
| a | — | — | — | −5.007E−08 |
| b | — | — | −2.878E−07 | −3.381E−08 |
| c | — | — | — | −2.182E−11 |
| d | — | — | −1.422E−12 | 2.873E−12 |
| e | — | — | — | −2.286E−15 |
| f | — | — | 1.686E−16 | −5.760E−16 |
| g | — | — | — | 3.674E−19 |
| h | — | — | 1.080E−20 | 1.881E−19 |
| i | — | — | — | −2.762E−23 |
| j | — | — | 6.329E−25 | 1.923E−24 |
| k | — | — | — | 9.602E−28 |
| l | — | — | 1.042E−28 | 7.600E−29 |

Numerical Example 2

The optical system preceding light deflector is as same as that of Example 1.

[Optical System Following Light Deflector]

β0 (lateral magnification of sub scanning direction between the light deflector and the surface to be scanned): 0.36

βh/β0: 0.97 (value at the image height where the difference in magnification from that of the center image height is largest)

TABLE 4

| Surface number | RY(mm) | RZ(mm) | X(mm) | N | note |
|---|---|---|---|---|---|
| Deflecting surface | ∞ | ∞ | 75.19 | — | Deflecting surface |
| 1* | −895.617 | ∞ | 21.51 | 1.527 | Scanning and imaging lens L1 |
| 2* | −123.584 | ∞ | 175.99 | — | — |
| 3** | −701.445 | 27.064 | 3.71 | 1.527 | Scanning and imaging lens L2 |
| 4** | −719.598 | 93.082 | 93.5 | — | — |
| 5 | — | — | — | — | Surface to be scanned |

Figure 9:
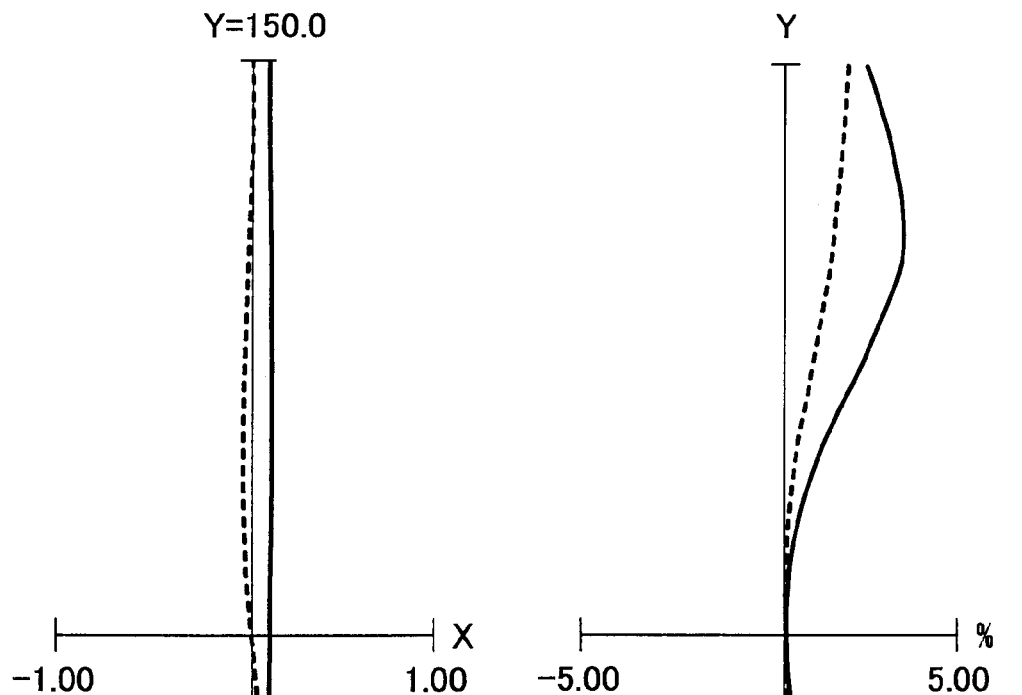
FIG. 9 is an aberration chart showing characteristics of the optical scanning optical system of Numerical example 2.

In Table 4, the shape of each surface marked with *,  is given by the same expression as is Numerical example 1. The aspheric coefficients of the present example are a shown in Table 5. In the present optical system, 1.9 mm thick soundproof glass (refractive index 1.511) is inserted, and the soundproof glass is placed at an angle in the 8 deg deflecting surface. The aberration chart of Numerical example 2 is shown in FIG. 9**.

TABLE 5

|   | First surface | Second surface | Third surface | Fourth surface |
|---|---|---|---|---|
| RY | −895.617 | −123.584 | −701.445 | −719.598 |
| K | 1.122E+02 | 2.028E−00 | −6.432E−01 | −1.224E+02 |
| A | −1.506E−07 | 3.159E−08 | 8.123E−08 | 4.983E−08 |
| B | 4.353E−11 | 3.164E−11 | −2.716E−12 | −8.062E−13 |
| C | −7.340E−15 | −1.051E−15 | −7.289E−17 | −1.616E−16 |
| D | −8.802E−19 | 7.556E−19 | 1.075E−21 | 1.655E−21 |
| E | 1.750E−22 | 5.955E−23 | 1.245E−25 | 1.641E−25 |
| F | −8.111E−26 | −7.268E−26 | — | — |
| RZ | ∞ | ∞ | 27.064 | 93.082 |
| a | — | — | — | −2.576E−07 |
| b | — | — | −1.748E−07 | 1.043E−07 |
| c | — | — | — | 3.147E−10 |
| d | — | — | −2.918E−12 | 8.517E−12 |
| e | — | — | — | −1.301E−13 |
| f | — | — | 1.775E−15 | −1.148E−15 |
| g | — | — | — | 2.067E−17 |
| h | — | — | −8.903E−20 | 1.759E−19 |
| i | — | — | — | −1.435E−21 |
| j | — | — | 1.050E−23 | −4.041E−24 |
| k | — | — | — | 3.621E−26 |
| l | — | — | −9.913E−28 | −6.270E−28 |

Accordingly, it is possible to realize an optical scanning device capable of correcting field curvature in the main and sub scanning directions to realize stability of the light spot while satisfactory keeping "conjugating function" and "speed equalizing function" in the scanning and imaging optical system, reducing ghost light on a surface to be scanned by light reflected at or between lens surfaces and improving the freedom of layout of scanning lenses.

Accordingly, it is possible to realize an optical scanning device capable of correcting field curvature in the main and sub scanning directions to realize stability of the light spot while satisfactory keeping "conjugating function" and "speed equalizing function" in the scanning and imaging optical system, and preventing occurrence of out of color registration and color change.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, providing constant optical magnification with respect to the image height of the light spot, preventing occurrence of out of color registration and color change and preventing occurrence of curving of the scanning line.

Accordingly, it is possible to obtain excellent optical performance while ensuring excellent beam position accuracy even in the case of environmental change. Additionally, the deflecting unit can be made smaller, so that an optical scanning device with reduced noise can be realized.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, and providing constant optical magnification with respect to the image height of the light spot.

Accordingly, it is possible to realize an optical scanning device having an optical magnification which is constant with respect to the image height of the light spot, and is capable of handling high density and high speed brought by multi beams configuration.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, separating the light beams toward the respective surfaces to be scanned while keeping the optical magnification constant with respect to the image height of the light spot, and obtaining adequate light intensity.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, and separating the light beams toward the respective surfaces to be scanned while keeping the optical magnification constant with respect to the image height of the light spot.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, and keeping the optical magnification constant with respect to the image height of the light spot at low cost.

Accordingly, it is possible to realize an optical scanning device capable of correcting field curvature in the main and sub scanning directions to realize stability of the light spot while satisfactory keeping "conjugating function" and "speed uniformizing function" in the scanning and imaging optical system, and keeping the optical magnification constant with respect to the image height of the light spot at low cost.

Accordingly, it is possible to realize an image forming apparatus capable of ensuring high quality image reproducibility.

Accordingly, it is possible to realize an image forming apparatus capable of ensuring high quality image reproducibility, forming multicolor or full color images, preventing occurrence of out of color registration or color change, and causing little out of color registration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanning device comprising:
   a light source;
   a deflecting unit configured to deflect a light beam from the light source; and
   a scanning and imaging optical system including at least two scanning lenses and configured to guide the light beam deflected by the deflecting unit to a surface to be scanned, wherein:
     one of the scanning lenses which is closest to the deflecting unit has a positive refractive power in a main scanning direction and zero or approximately zero refractive power in a sub scanning direction,
     another one of the scanning lenses which is closest to the surface to be scanned has a negative refractive power in the main scanning direction, a positive refractive power in the sub scanning direction, and an incidence surface in the sub-scanning direction which is convex toward the deflecting unit and an exit surface being concave toward the surface to be scanned,
     the optical scanning device comprising a plurality of light sources including said light source,
     the deflecting unit is configured to deflect a plurality of light beams from the plurality of light sources,
     the scanning and imaging optical system is configured to guide the light beams to different surfaces to be scanned, and
     the light beams directed to the different surfaces to be scanned pass through the one of the scanning lenses which is closest to the deflecting unit approximately in parallel with each other in the sub scanning direction.

2. The optical scanning device according to claim 1, configured to satisfy an expression which is $$0.9<|\beta h/\beta 0|<1.1$$

wherein $\beta 0$ is lateral magnification in the sub scanning direction on an optical axis between a deflecting surface and the surface to be scanned, and $\beta h$ is lateral magnification in the sub scanning direction of an arbitrary image height.

3. The optical scanning device according to claim 1, configured to satisfy an expression which is $$0.2<|\beta 0|<0.6$$

wherein $\beta 0$ is lateral magnification in the sub scanning direction on an optical axis between a deflecting surface and the surface to be scanned.

4. The optical scanning device according to claim 1, configured to satisfy an expression which is $$0.3<|a/L|<0.6$$

wherein L is distance between a base point on a deflecting surface on an optical axis and the surface to be scanned and "a" is the largest interval along the optical axis between the scanning lenses.

5. The optical scanning device according to claim 1, wherein at least one of the scanning lenses is formed of plastic.

6. The optical scanning device according to claim 5, wherein the one of the scanning lenses closest to the deflecting unit is formed of plastic.

7. The optical scanning device according to claim 1, wherein the at least two scanning lenses are separated from each other.

8. An image forming apparatus for forming multicolor or full color images, comprising:
   a plurality of image bearing members;
   an optical writing unit configured to perform optical writing according to image information to form a latent image on each of the image bearing members;

a developing unit configured to develop the latent images on the image bearing members into visible images;

a transferring unit configured to transfer the visible images on the image bearing members onto a material directly or via an intermediate transferring member; and a fixing unit configured to fix the visible images transferred onto the material;

wherein the optical writing unit comprises an optical scanning device including:

a light source;

a deflecting unit configured to deflect a light beam from the light source; and a scanning and imaging optical system including at least two scanning lenses and configured to guide the light beam deflected by the deflecting unit to a surface to be scanned, wherein:

one of the scanning lenses which is closest to the deflecting unit has a positive refractive power in a main scanning direction and zero or approximately zero refractive power in a sub scanning direction, another one of the scanning lenses which is closest to the surface to be scanned has a negative refractive power in the main scanning direction, a positive refractive power in the sub scanning direction, and an incidence surface convex toward the deflecting unit and an exit surface being concave toward the surface to be scanned, the image forming apparatus comprising a plurality of light sources including said light source, wherein the deflecting unit is configured to deflect a plurality of light beams from the plurality of light sources, the scanning and imaging optical system is configured to guide the light beams to different surfaces to be scanned, and the light beams directed to the different surfaces to be scanned pass through the one of the scanning lenses which is closest to the deflecting unit approximately in parallel with each other in the sub scanning direction.

9. The image forming apparatus according to claim 8, wherein the at least two scanning lenses are separated from each other.

* * * * *